Figure 1:
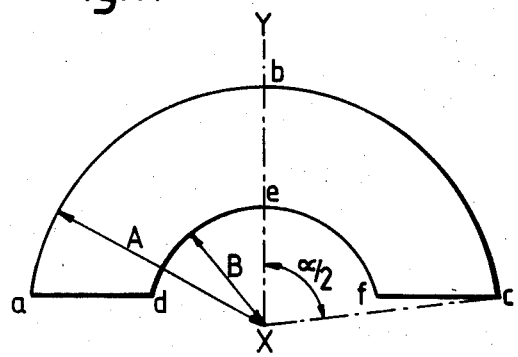

United States Patent [19]

Lord et al.

[11] Patent Number: 4,707,351
[45] Date of Patent: Nov. 17, 1987

[54] CATALYST AND CATALYTIC PROCESS

[75] Inventors: Leslie W. Lord, Stockton-on-Tees; Kevin Kendall, Runcorn Cheshire; David T. Williams, Yarm; John H. Bateson, Stockton-on-Tees, all of England

[73] Assignee: Imperial Chemical Industries PLC, London, England

[21] Appl. No.: 818,753

[22] Filed: Jan. 14, 1986

[30] Foreign Application Priority Data

Jan. 22, 1985 [GB] United Kingdom ............... 8501526

[51] Int. Cl.$^4$ ............................................. C01B 3/38
[52] U.S. Cl. ............................... 423/648 R; 252/373; 423/415 A; 423/651; 423/652; 423/653; 423/654; 502/439; 502/527
[58] Field of Search ............... 423/652, 415 A, 648 R, 423/651, 653, 654

[56] References Cited

U.S. PATENT DOCUMENTS

| 4,349,450 | 9/1982 | Hunter | 502/439 |
| 4,410,366 | 10/1983 | Birchall et al. | 502/439 |
| 4,460,704 | 7/1984 | Twigg | 502/439 |
| 4,581,157 | 4/1986 | Twigg | 502/326 |

FOREIGN PATENT DOCUMENTS 1478899  7/1977  United Kingdom .

OTHER PUBLICATIONS

Brochure, Catalytic Products, Chemical Process Products, 3M-41726-10/81.

*Primary Examiner*—John Doll
*Assistant Examiner*—Wayne A. Langel
*Attorney, Agent, or Firm*—Cushman, Darby & Cushman

[57] ABSTRACT

Reforming a hydrocarbon, or hydrocarbon derivative, feedstock with steam and/or carbon dioxide using saddle shaped units made of a low silica calcium aluminate cement composition as the catalyst support. The support preferably has a surface area of at least 0.5 $m^2g^{-1}$ and a pore volume of at least 0.1 $cm^3g^{-1}$.

7 Claims, 5 Drawing Figures

CATALYST AND CATALYTIC PROCESS

This invention relates to a catalyst and catalyst process for the production of hydrogen by gaseous phase reaction of a hydrocarbon feedstock with steam or, where appropriate, carbon dioxide.

This process has been carried out on an increasing industrial scale since the late 1920s as the first step in converting hydrocarbons, especially natural gas, to hydrogen, ammonia synthesis gas or carbon oxides/hydrogen synthesis gases. The reaction of such hydrocarbons with steam is termed steam reforming. Since the steam reforming reaction is strongly endothermic, the catalyst for it is usually disposed in tubes heated externally in a furnace, but there have been proposals to use an alternative procedure in which the reactants are heated in the absence of catalyst and then reacted adiabatically over the catalyst, this sequence being possibly repeated at least once.

Catalysts for such processes have most commonly been supported on a refractory material such as alumina or hydraulic cement. They should be mechanically strong to avoid damage during loading of the catalyst bed and during use and should also have a high surface area and porosity for optimum catalytic activity. To minimise the pressure drop across the bed, the catalyst is usually formed in shaped pieces such as hollow cylinders. The conventional catalyst for the tube steam reforming process has been in the form of ceramic "Raschig" rings about 17 mm in height and diameter and with walls typically 5 mm thick. Recently it has been proposed to make such cylinders with relatively thin walls and internal reinforcing partitions, as described in U.S. Pat. Nos. 4,089,941, 4,233,187, G.B. Pat. No. 1513544 and French Pat. No. 2375138. However, increasing catalyst surface area and porosity in the manner described in these patents decreases mechanical strength and therefore such processes have so far depended on catalysts in which such requirements have been met to a degree based on compromise.

One catalyst support shape that offers significant advantages in terms of pressure drop and geometric surface area is the saddle configuration which can be considered to be a planar strip of generally rectangular cross-section, but which may have one or more indentations, perforations and/or transverse or longitudinal ribs, that has been deformed by bending such that the strip is curved both along its length and across its width with the centre or centres of the lengthwise curvature on the opposite side of the strip to the centre or centres of widthwise curvature.

Under the conditions normally encountered in a steam reforming process, silica has an appreciable volatility and so the presence of a substantial amount of silica in the support is undesirable. It is indeed desirable that the support contains less than 1, preferably less than 0.5,% by weight of silica.

While saddles can readily be fabricated from metals and certain ceramic compositions of appreciable silica content, it has not heretofore been practical to produce catalyst supports for steam reforming of a saddle configuration having the requisite combination of strength and porosity from ceramic materials of low silica content.

We have now found that saddles having the requisite combination of strength and porosity for use as a steam reforming catalyst support can be produced from hydraulic cement compositions comprising calcium aluminate.

According to the invention a process of reacting a hydrocarbon, or hydrocarbon derivative, with steam and/or, where appropriate, carbon dioxide, over a catalytically active material to produce a gas containing hydrogen is characterised in that the catalytically active material is supported by a catalyst support having a saddle configuration and comprising a calcined low silica calcium aluminate cement composition.

The hydrogen producing reactions are:

$$CH_4 + H_2O \rightarrow CO + 3H_2$$

$$\text{``}CH_2\text{''} + H_2O \rightarrow CO + 2H_2$$

("$CH_2$" represents hydrocarbons higher than methane, for example normally gaseous hydrocarbons and normally liquid hydrocarbons boiling at up to 200° C.). The analogous reactions with carbon dioxide $$CH_4 + CO_2 \rightarrow 2CO + 2H_2$$

$$\text{``}CH_2\text{''} + CO_2 \rightarrow 2CO + H_2$$

can be carried out separately or with the steam reaction.

These reactions are strongly endothermic and the process is especially suitable when they are carried out with external heating as in tubular steam reforming. Alternatively the heat can be supplied by heating the reactants and passing steam over the catalyst in an adiabatic bed or in a hybrid process in which oxygen is a reactant, so that heat evolved in oxidation is absorbed by the endothermic reactions. The hybrid process can be applied to the product of the tubular or adiabatic process that is, in "secondary reforming", or to fresh feedstock ("catalytic partial oxidation"). Commonly these reactions are accompanied by the shift reaction:

$$CO + H_2O \rightarrow CO_2 + H_2.$$

If the starting hydrocarbon is "$CH_2$" and the temperature is relatively low, the methanation reaction (exothermic) may also occur. However, the process is operated preferably in net endothermic conditions and the hydrogen containing gas produced contains at least 30% v/v of hydrogen on a dry basis. Preferably it contains less than 30, especially less than 10, % v/v of methane on a dry basis. For the production of hydrogen-containing synthesis gas, the outlet temperature is preferably at least 600° C. to ensure low methane content. While the temperature is generally in the range 750°–900° C. for making synthesis gas for ammonia or methanol production, it may be as high as 1100° C. for the production of metallurgical reducing gas, or as low as 700° C. for the production of town gas. For the hybrid process using oxygen the temperature may be as high as 1300° C. in the hottest part of the catalyst bed.

For these reactions the catalyst usually comprises metallic nickel and/or cobalt. The pressure is typically in the range 1–50 bar abs. but pressures up to 120 bar abs. are proposed. An excess of steam and/or carbon dioxide is normally used, especially in the range 1.5 to 6, for example 2.5 to 5, mols of steam or carbon dioxide per gram atom of carbon in the starting hydrocarbon.

Alternatively the feedstock in the hydrogen producing reaction is a hydrocarbon derivative: the most important reaction is methanol decomposition $$CH_3OH + H_2O \rightarrow CO_2 + 3H_2$$

The reaction of ethanol or isobutyraldehyde with steam to produce a hydrogen-containing gas has been proposed for industrial operation. Usually the hydrocarbon derivative is an aliphatic alcohol, ether, ester or amine and its boiling point is not over 200° C. The catalyst is for example zinc oxide/chromium oxide or metallic copper, if a gas of low methane content is required and the outlet temperature is to be under 500° C. The reaction may be accompanied by methanation of the carbon oxides and hydrogen, especially when a town gas or substitute natural gas is to be produced, in which an iron/chromium oxide catalyst or a nickel and/or cobalt catalyst is used. The formation of methane can, of course, be limited by operating at a high enough temperature and steam excess, as in the hydrocarbon steam reaction.

In the present invention the catalyst is supported on a ceramic support having the saddle configuration and comprising a low silica calcium aluminate cement.

The method normally used for the production of ceramic catalyst supports involves pelletising using a dry particulate composition containing a refractory oxidic material, optionally in admixture with a pelletising aid such as graphite, and then the resultant pellet is subjected to calcination. Where the refractory oxidic material is hydratable, e.g. a hydraulic cement, the pellet may be treated with water or steam prior to calcination. An example of such a process is described in U.S. Pat. No. 4,329,530.

In a pelletising process large compressive forces are employed essentially to compact the particles together to reduce the voidage therebetween: little flow of the particles relative to one another takes place and so this technique is only of use for the manufacture of supports having relatively simple shapes such as cylindrical pellets. If however complex shapes such as saddles are required, i.e. as in the present invention, and they are to be produced by conventional pelletising techniques, very high calcining temperatures normally have to be employed to give adequate mechanical strength to the support: this inevitably reduces the porosity and surface area of the support, which detracts from the usefulness of the support. Consequently conventional palletising processes are not particularly suitable for making the supports of the invention. The supports employed in the process of the present invention may be made by moulding a homogeneous plastic composition comprising the calcium aluminate cement, water, and a water swellable or water soluble polymer, into the desired saddle configuration, allowing the moulded composition to harden and then calcining the resultant moulded saddle in air to remove residual water and said polymer and to cause the refractory components of the composition to bond to one another to give the desired micromeritic properties.

The homogeneous mouldable composition may conveniently be produced by the procedure described in U.S. Pat. No. 4,410,366, e.g. by forming a sheet, e.g. by means of a two-roll mill, or a profile, e.g. by extrusion, of a composition containing the hydraulic cement, polymer and water.

The resultant homogeneous composition should of course be moulded, e.g. by compression moulding, to the desired saddle configuration while the composition is still in the deformable, green, state.

In order that a catalyst support of adequate strength and having the requisite porosity, namely a pore volume of at least 0.1 cm$^3$.g$^{-1}$, and a total surface area of, at least 0.5, particularly at least 1, m$^2$g$^{-1}$ can be obtained, the composition employed to form the support is preferably selected following the criteria set out in aforesaid U.S. Pat. No. 4,410,366 for producing mouldable calcium aluminate cement compositions.

The homogeneous composition includes a low silica calcium aluminate cement, which may be a mixture of calcium aluminate and alumina. Suitable cements include Ciment Fondu, Secar 50, Secar 71 and Secar 80.

Other oxidic materials, e.g. zirconia and titania, may be incorporated into the composition. While silica may in some cases be incorporated, for use as a steam reforming support a low silica content, i.e. less than 1% by weight, based on the weight of the oxidic material in the composition, is necessary. The refractory oxidic material of the composition preferably contains less than 50% by weight of oxidic material other than calcium aluminate and alumina.

The homogeneous composition also contains water and a water soluble, or water swellable, polymer: examples of water soluble or water swellable polymers include partially hydrolysed polyvinyl acetates, especially those having a degree of hydrolysis of at least 50%, and particularly between 70 and 90%.

Particularly suitable compositions comprise, per 100 parts by weight of refractory oxidic material consisting of calcium aluminate and optionally alumina and/or other oxidic material, said refractory oxidic material having a calcium to aluminium atomic ratio of 1:4 to 1:10 and containing no more than 10% by weight of oxidic material other than calcium aluminate, calcium oxide and alumina, from 5 to 10 parts by weight of a partially hydrolysed polyvinyl acetate of degree of hydrolysis 70 to 90% and 10 to 20 parts by weight of water.

Figure 2:
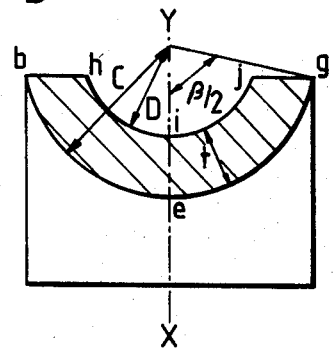
Figure 3:
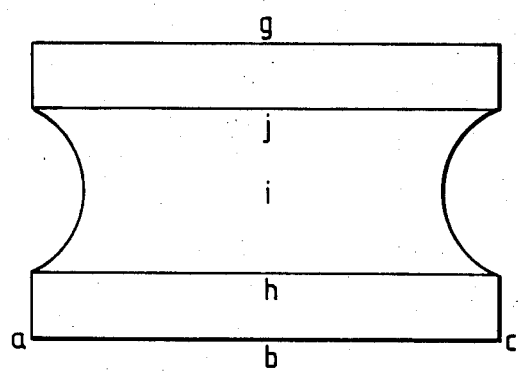
Figure 4:
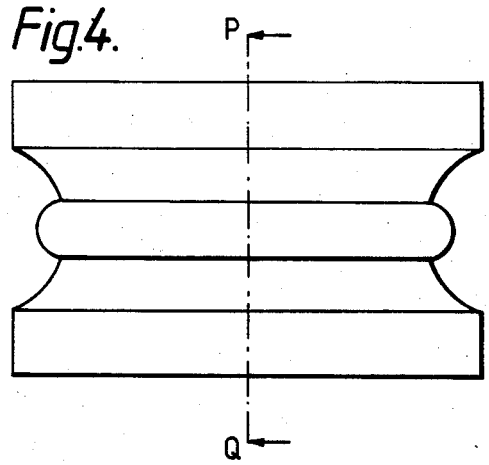
Figure 5:
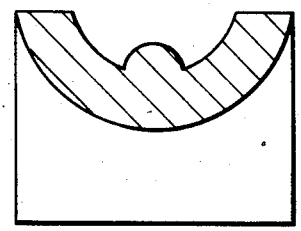

The shape of the saddles is illustrated by reference to the accompaying drawings wherein
FIG. 1 is a side elevation
FIG. 2 is a section along the line XY of FIG. 1
FIG. 3 is a plan view
FIG. 4 is a plan view of a modified form of
FIG. 5 is a section along line PQ of FIG. 4.

The geometric configuration of the basic shape of a saddle is conveniently defined by the outer and inner curves abc and def of the side elevation (FIG. 1), the outer curve beg and the thickness t of the section (FIG. 2) and the angles $\alpha$ and $\beta$.

In FIG. 1 the centres of curvature for curves abc and def are shown to be co-incident at point X. Likewise in FIG. 2 the centre of curvature for the outer curve beg and the inner curve hij are also shown to be co-incident, at point Y. It is not essential, but is preferred, that those centres of curvature are co-incident.

In the FIGS. 1 and 2 the curves abc, def, beg and hij are shown as arcs of a circle, i.e. each curve having a constant radius of curvature.

It is not essential, although it is preferred, that these radii are constant along the length of the curve. It is, however, generally desirable that, along the length of any of the curves, the radius of curvature does not vary from the arithmetic mean of the maximum and minimum radius of that curve by more than about 25%. Likewise the thickness t may be uniform or may vary from one part of the saddle to another. Again it is preferred that the thickness does not vary from the arithmetic mean of the maximum and minimum thicknesses by more than 25%. In determining the minimum thickness, the reduction of thickness resulting from any rounding of the edges should be ignored.

Therefore, where reference is made to a radius or to the thickness and that radius varies along the length of the curve and/or the thickness varies, the aforesaid arithmetic means are to be understood.

In FIGS. 1 and 2 the radii of curves abc, def, beg, and hij are designated respectively as radii A, B, C, and D. Thus radii A and B are, respectively, the radii of maximum and minimum lengthwide curvature of the saddle while radii C and D are, respectively, the radii of maximum and minimum widthwise curvature of the saddle.

Angles $\alpha$ and $\beta$ are respectively the angle subtended at the centre of maximum lengthwise curvature by the ends of the saddle and the angle subtended at the centre of maximum widthwise curvature by the sides of the saddle.

For the desired combination of high geometric surface area, low pressure drop, and adequate strength, the the thickness t is preferably 0.2 to 0.5 times radius A.

Radius B is preferably greater than 0.2 times radius A, and should be greater than A cos $\alpha/2$. The sum of radius B and thickness t is preferably less than 0.75 times radius A.

Angles $\alpha$ and $\beta$ should not be more than about 180° to avoid re-entrant shapes which would weaken the structure and present moulding difficulties, but are each preferably above 120° and particularly above 140°. It is preferred that angles $\alpha$ and $\beta$ are each between 150° and 180°, and preferably preferably are substantially equal.

It will be appreciated that modifications to the basic saddle shape may be employed. Thus a longitudinal rib may be provided as shown in FIGS. 4 and 5: alternatively there may be transverse ribs or the saddle edges may be provided with indentations, e.g. castellations.

Likewise the corners of the saddle may be rounded, for example to give "Berl" saddles. Rounding of the corners is desirable as it is the corners that are liable to damage giving rise to fines in the catalyst bed.

The radius A employed will generally be in the range 3 to 30 mm and will depend to some extent on the size of the vessel containing the catalyst pieces. It is preferred that radius A is between 0.03 and 0.2, in particular between 0.05 and 0.1, times the minimum cross-sectional dimension of the vessel, e.g. the tube diameter when a tubular reforming process is employed.

Saddles of the type described may be made as mentioned previously by compression moulding of a billet of the homogeneous calcium aluminate cement/polymer/water composition.

After moulding the saddles should be dried, typically at under 200, especially at under 100, °C., with care to avoid non-uniformity of heating and consequent strains. If desired over-rapid drying can be avoided by controlling the relative humidity of the drying atmosphere at a high level, for example at over 50, especially over 70%. Curing of the calcium aluminate cement may take place prior to, or during, such a drying step, e.g. by heating the extrudate under conditions of controlled relative humidity prior to volatilising residual water.

The calcination step usually includes treatment at 400° to 700° C. in air to decompose and/or burn out any organic components, e.g. the polymeric material added to aid moulding.

Further calcination, typically at tempertures in the range 900° to 1600° C., will normally be employed, as is known in the art, to effect bonding of the cement particles and any other refractory oxidic particulate material present to give the required micromeritic properties. As is well known, the strength increases, while the porosity and surface area decrease, as the calcination temperature increases.

Hence the calcination should be effected at sufficient temperature to obtain the required mechanical strength but should not be so high that the surface area and porosity are unduly reduced.

The catalyst support pieces preferably have a total surface area, as measured by nitrogen absorption, of 0.5 to 40, particularly 1 to 15, $m^2g^{-1}$, and a pore volume of 0.1 to 0.3 $cm^3.g^{-1}$, as calculated from the helium and mercury densities.

Prior to the final calcination, the support may be "alkalised" by impregnation with an alkali such as a solution of potassium hydroxide. This serves to minimise lay down of carbon on the catalyst during steam reforming resulting from high temperature cracking of hydrocarbons and from the reaction of carbon oxides with hydrogen.

After calcination the support is impregnated or coated with the catalytically active material or a precursor thereto, e.g. a compound that can be converted, e.g. by heat or by reduction with a hydrogen containing gas stream, to the active material.

For the hydrocarbon steam reaction the catalyst preferably contains nickel and/or cobalt, in an amount (calculated as monoxide) typically of 0.2 to 35, especially 1 to 25%, w/w of nickel and/or cobalt. Within this range 8 to 20% w/w is preferred.

The specific surface of the catalytic metal is suitably in the range 0.1 to 50 $m^2/g$ of catalyst. Within this range, larger areas are preferred for reactions under 600° C.

Where the active material is produced by heating or reduction, that activation step may be effected after charging the impregnated support to the reaction vessel in which the process of the invention is to be performed.

The mechanical strength of the catalyst pieces is desirably such that only a small proportion thereof will suffer gross breakage during normal handling, including transport and loading into the plant, and during normal plant use over a reasonable catalyst lifetime, typically 2 years. In this specification the following bed crush test procedure is used to assess the mechanical strength of the support pieces or of the support pieces impregnated with the catalytically active material or a precursor thereto. A layer of cylindrical alumina pellets of height and diameter 3.2 mm is poured into a hollow vertically disposed, cylinder that is closed at the bottom to form a cushion layer of depth 25 mm. 100 support pieces to be tested are poured on top of the cushion layer so as to form a random packed bed of the pieces within the cylinder. A further 25 mm deep cushion layer of the alumina pellets is poured on top of the randomly disposed support pieces and then a close-fitting flat-ended piston is lowered gently into the cylinder until it contacts the upper cushion layer. A load is gently applied to the piston and then, after 1 minute, the load is removed and the piston withdrawn. The support pieces are poured out and the number of grossly damaged support pieces is counted. The test is repeated, replacing any grossly damaged support pieces with fresh pieces, at an increased load.

By a grossly damaged piece we mean a piece that has broken into two or more parts none of which has a mass above 90% of the mass of the original piece.

It will be appreciated that the volume occupied by the random packed bed of the 100 pieces will depend on their size and shape. The internal diameter of the cylinder that should be employed in the test thus depends on the volume occupied by a random packed bed of the 100 pieces. For volumes between 0.85 (n−1)$^3$ and 0.85 n$^3$ ml, (where n is an integer), the internal diameter of the cylinder should be (1.5±0.05)n cm. Thus for bed volumes of between about 184 and 292 ml a cylinder of internal diameter 10.15-10.85 cm should be used. At a bed volume of 184 ml using a cylinder of internal diameter 4 inches (10.16 cm) the bed of pieces under test has a height/diameter ratio of 0.22 while at a volume of 292 ml the height/diameter ratio is 0.35.

To be considered to have adequate strength in this test, the maximum number of grossly damaged pieces at the following total loads (including that given by the weight of the piston) are as follows:

| load (bar g) | Maximum no. of grossly damaged pieces |
| --- | --- |
| 3 | 1 |
| 4.5 | 2 |
| 6 | 4 |

Saddles having such an adequate strength are herein termed crush-resistant.

Accordingly the present invention further provides a catalyst support suitable for use as a steam reforming catalyst support characterised in that the support is in the form of a crush resistant saddle and comprises a calcined low-silica calcium aluminate cement composition, said support having a surface area of at least 0.5 m$^2$g$^{-1}$ and a pore volume of at least 0.1 cm$^3$g$^{-1}$.

Also according to a further aspect of the invention we provide a precursor to a steam reforming catalyst comprising saddles formed from a calcined aluminate composition impregnated with a nickel and/or cobalt compound.

The invention is illustrated by the following examples, in which all parts and percentages are expressed by weight, except where otherwise stated.

EXAMPLE 1

100 parts of a high alumina, low silica, calcium aluminate cement (SECAR 80 supplied by Lafarge—81% Al$_2$O$_3$, 17.5% CaO, 0.36% Na$_2$O, 0.2% SiO$_2$) was dry mixed with 7 parts of a partially hydrolysed polyvinyl acetate having a degree of hydrolysis of 80% and molecular weight about 100,000 (supplied by Nippon Gohsei). 12 parts of water were sprinkled over the surface of the powder mixture. The resulting composition was then stir mixed to give a moist crumb which was then repeatedly passed between the rollers of a roll mill until a homogeneous plastic sheet of approximate thickness 3 mm was produced. This sheet was then cut into rectangles of approximate dimensions 28 mm×12 mm.

A saddle having the dimensions A=10 mm, B=5 mm, C=5 mm, D=2.5 mm, α=170° and β=170° (see FIGS. 1 and 2) was then stamped from each rectangle using a hand operated lever press. In this stamping operation, the faces of the male and female stamping die components were sprayed with a silicone-free release aid (D 55 mould release aid supplied by Industrial Science Ltd) and then the rectangular piece cut from the homogeneous plastic sheet was placed in the female die. The male die was then lowered into position and a force of about 2.7 kg was applied to deform the rectangle to the required saddle configuration.

After pressing the saddles were left to stand for 2 hours during which time the material stiffened as a result of further hydrolysis of the polyvinyl acetate. The above operations were all performed at room temperature.

The saddles were then dried at 1100° C. for 12 hours and then placed in an air furnace whose temperature was then slowly increased to 500° C. and maintained at that temperature for 2 hours during which time the organic polymer burnt out. The temperature was then raised to 1150° C. and held at that temperature for a further 2 hours to effect sintering of the cement particles and phase changes in the material to give the finished catalyst support.

EXAMPLE 2

The procedure of Example 1 was repeated using 8 parts of the hydrolysed polyvinyl acetate and 17 parts of water per 100 parts of the cement. In this Example instead of milling the crumb to give a sheet, the crumb was pugged in a vacuum pug mill and then the pugged material was extruded, at room temperature, using a water cooled screw extruder, through a die to give a continuous rope of circular cross-section (diameter approximately 8 mm). This rope was cut into 17 mm lengths. The cut lengths were used instead of the rectangles for the stamping operation. After calcining at 1150° C. the support was tested.

In the bed crush strength test, using a cylinder of internal diameter 10.16 cm, the number of grossly damaged pieces were as follows:

| load (bar g) | no. of grossly damaged pieces |
| --- | --- |
| 4.1 | 0 |
| 4.8 | 1 |
| 5.5 | 1 |
| 8.3 | 2 |

It is seen that the strength of the pieces was well above the minimum requirement.

The micromeritic properties were as follows:

| | |
| --- | --- |
| total surface area | 1.4 m$^2$g$^{-1}$ |
| pore volume | 0.13 cm$^3$.g$^{-1}$ |
| average pore radius | 1864 Å. |

EXAMPLE 3

Saddles having the geometric configuration of those of Example 1 with dimension A=20 mm were prepared by the procedure Example 1 and calcined at 1100° C., to give a support having the following micromeritic properties:

| | |
| --- | --- |
| total surface area | 1.8 m$^2$.g$^{-1}$ |
| pore volume | 0.21 cm$^3$.g$^{-1}$ |
| mean pore radius | 2330 Å. |

When subjected to the crushing test using a vessel of internal diameter 10.16 cm, even at a load of 7.6 bar g, only one piece was grossly damaged out of the 100 test pieces.

The calcined saddles were then immersed in nickel nitrate solution, containing 1 kg $Ni(NO_3)_2.6H_2O$ per liter of water, for 30 mins, drained and dried at 110° C. for 12 hours. This impregnation process was repeated. The material was then fired to 525° C. for 2 hours to convert nickel nitrate to nickel oxide (NiO) by loss of nitrogen oxides. The resultant level of NiO in the pellets was 8.8% by weight.

A 500 ml charge of the impregnated saddles was packed into a tubular reactor of internal diameter 50 mm equipped for external heating. The nickel oxide was reduced to active catalyst by passing a steam/hydrogen (8:1 by volume) mixture at 750° C. through the bed for 18 hours. A steam/methane (3:1 volume ratio) mixture was passed through the catalyst bed at atmospheric pressure at a rate of 1000 1/hr (at room temperature, 1 bar absolute), with the tube heated to 780° C. The methane content of the exit gas was 2.6% by volume (dry gas analysis).

EXAMPLE 4

Example 3 was repeated but using a calcination temperature of 1300° C. to give a support having the following micromeritric properties:

| | |
|---|---|
| total surface area | 1.43 $m^2.g^{-1}$ |
| pore volume | 0.2 $cm^3.g^{-1}$ |
| mean pore radius | 2800 Å. |

The calcined support was given 4 dips in the nickel nitrate solution to give an impregnated support having a NiO content of 19.8%.

In the steam reforming test, the tube temperature was maintained at 759° C. giving an exit gas methane content of 4.2% by volume.

EXAMPLE 5

Example 4 was repeated except that the calcined support was coated with a high surface area alumina by twice dipping into an alumina sol, drying and calcining at 700° C. prior to nickel nitrate impregnation. Two nickel nitrate dips were employed. The alumina coating formed 12% by weight of the coated saddles. The NiO content of the impregnated coated saddles was 12.6%. In the steam reforming test, the tube temperature was 777° C. giving an exit gas methane content of 3.8% by volume.

EXAMPLE 6

The intrinsic activity, i.e. activity per unit geometric surface area, of a catalyst of given nickel content depends on the micromeritic properties of the support rather than on the support shape and so the intrinsic activity can conveniently be assessed using pellets of a standard shape and size.

Cylindrical pellets of diameter 5.4 mm and length 4 mm were therefore pressed from a milled sheet produced by the technique described in Example 1 and then dried as in Example 1.

By way of comparison pellets of the same size and shape were also made from the calcium aluminate cement by conventional dry pelletising using graphite as a pelletising aid.

The polymer (or graphite in the case of the pellets made by dry pelletising) was burnt out as described in Example 1 and then the pellets were calcined. Calcination temperatures of 1100°, 1350° and 1400° C. were employed.

The calcined pellets were then impregnated to similar nickel oxide contents by the procedure described in Example 3.

The intrinsic activities of the catalyst were assessed by charging a 50 mm diameter tubular reactor with a mixture of alumina chips and a known number of pellets (and hence a known catalyst geometric surface area), reducing the nickel oxide to active catalyst as in Example 3, and then using the resultant catalyst for steam reforming methane under standard conditions (650° C.; steam/methane ratio 3; pressure 30 bar absolute): the activity was assessed by measuring the gas flow rate required to give an exit gas of particular methane content.

It was found that, at each calcination temperature, the catalyst produced from the pellets made from the milled sheet had a similar intrinsic activity to catalyst produced from the pellets made by dry pelletising.

However the effectiveness of a catalyst bed of given volume in a steam reforming process depends on the intrinsic activity of the catalyst, i.e. the activity per unit geometric surface area, and the geometric surface area of the catalyst per unit bed volume.

Since the technique used to make the catalysts of the invention gives catalysts of similar intrinsic activity to catalysts made by dry pelletising, the effectiveness of a bed of catalyst in accordance with the invention will depend on the geometric surface area per unit bed volume. Also certain other relevant chemical engineering parameters, viz the pressure drop encountered on passage of a gas through the catalyst bed and the heat transfer co-efficient are largely determined by the shape and size of the support pieces.

To assess these parameters calcined saddles of various sizes were made as described in Example 1. The saddles had the same geometric configuration as in Example 1: i.e. the ratios of dimensions B, C and D to dimension A were the same in each case and in each case angles $\alpha = \beta = 170°$.

The geometric surface area per unit bed volume and the other parameters were assessed using random packed beds of the saddles in tubes of internal diameter 10.16 cm. To aid comparison the results are quoted as percentages of the values obtained using standard support pieces in the form of hollow cylinders of height 17 mm, external diameter 17 mm, and internal diameter 7 mm.

The results were as follows:

| Saddles Dimension A (mm) | Surface area per unit bed volume | Pressure drop | Heat transfer coefficient |
|---|---|---|---|
| 5 | 360 | 244 | 120 |
| 7.5 | 160 | 91 | 96 |
| 10 | 120 | 60 | 85 |
| 15 | 70 | 38 | 74 |
| Standard support | 100 | 100 | 100 |

It is thus seen that the catalysts in accordance with the present invention can offer considerable advantages.

We claim:

1. A process of reacting a hydrocarbon, or hydrocarbon derivative, with steam, and/or carbon dioxide, over a catalytically active material to produce a gas containing hydrogen characterised in that the catalytically active material is supported by a calcined refractory oxide catalyst support having a saddle configuration, a surface area of at least 0.5 $m^2g^{-1}$, and a pore volume of at least 0.1 $cm^3g^{-1}$, said calcined refractory oxide support containing less than 1% by weight of silica and consisting of a calcined calcium aluminate cement composition containing less than 50% by weight of oxidic material other than calcium aluminate and alumina.

2. A process according to claim 1 wherein said calcined low silica calcium aluminate cement composition has a calcium to aluminium atomic ratio in the range 1:4 to 1:10 and contains no more than 10% by weight of oxidic material other than calcium aluminate, calcium oxide, and alumina.

3. A process according to claim 1 wherein said supported catalytically active material is randomly disposed in externally heated tubes through which the hydrocarbon, or hydrocarbon derivative, and steam and/or carbon dioxide is passed, and wherein the radius of maximum lengthwise curvature of the saddles is between 0.03 and 0.2 times the tube diameter.

4. A process according to claim 1 wherein the angle subtended at the centre of maximum lengthwise curvature by the ends of the saddle and the angle subtended at the centre of maximum widthwise curvature by the sides of the saddle are each in the range 150° to 180°.

5. A process according to claim 1 wherein the saddle thickness is 0.2 to 0.5 times the radius of maximum lengthwise curvature of the saddle.

6. A process according to claim 1 wherein the radius of minimum lengthwise curvature is at least 0.2 times the radius of maximum lengthwise curvature 7. A process according to claim 1 wherein said catalytically active material is nickel and/or cobalt.

* * * * *